United States Patent
Dong et al.

(10) Patent No.: US 12,385,391 B2
(45) Date of Patent: Aug. 12, 2025

(54) ROCK-PIERCING FLEXIBLE ROCK DRILLING ROBOT AND ROCK BREAKING METHOD

(71) Applicant: CENTRAL SOUTH UNIVERSITY, Changsha (CN)

(72) Inventors: Longjun Dong, Changsha (CN); Jian Wang, Changsha (CN); Yihan Zhang, Changsha (CN); Jiachuang Wang, Changsha (CN); Zheng Tang, Changsha (CN); Zhongwei Pei, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 483 days.

(21) Appl. No.: 17/889,345

(22) Filed: Aug. 16, 2022

(65) Prior Publication Data

US 2023/0059714 A1   Feb. 23, 2023

(51) Int. Cl.
| | |
|---|---|
| *E21D 9/11* | (2006.01) |
| *E21B 49/00* | (2006.01) |
| *E21C 27/00* | (2006.01) |
| *E21C 35/00* | (2006.01) |
| *E21C 41/22* | (2006.01) |
| *E21D 9/00* | (2006.01) |

(Continued)

(52) U.S. Cl.
CPC ............. *E21B 49/00* (2013.01); *E21C 27/00* (2013.01); *E21C 35/282* (2023.05); *E21C 35/302* (2023.05); *E21C 41/22* (2013.01); *E21D 9/003* (2013.01); *E21D 9/113* (2013.01); *E21F 17/18* (2013.01); *G01V 1/40* (2013.01); *G01V 2210/642* (2013.01); *G01V 2210/644* (2013.01); *G01V 2210/646* (2013.01)

(58) Field of Classification Search
CPC ........ E21D 9/1093; E21D 9/112; E21D 9/113
USPC ......................................... 299/55, 58, 31, 33
See application file for complete search history.

(56) References Cited

U.S. PATENT DOCUMENTS

| 197,456 A | * | 11/1877 | Cargill | |
|---|---|---|---|---|
| 2,766,978 A | * | 10/1956 | Robbins | .................. E21D 9/112 |
| | | | | 299/60 |

(Continued)

FOREIGN PATENT DOCUMENTS

| CA | 2727949 | * | 7/2012 |
|---|---|---|---|
| CN | 1131720 A | | 9/1996 |

(Continued)

*Primary Examiner* — Sunil Singh
(74) *Attorney, Agent, or Firm* — Bayramoglu Law Offices LLC

(57) ABSTRACT

A rock-piercing flexible rock drilling robot and a rock breaking method therefor are disclosed. The robot includes a control system, a head, and at least one tail. The head includes a head housing, a propulsion turntable, a drilling mechanism, a hydraulic propulsion system, a first driving mechanism, and a second driving mechanism. The propulsion turntable includes a drill bit located at a center thereof and a cutting turntable arranged around the drill bit. The first driving mechanism is connected to the drill bit, and the second driving mechanism is connected to the cutting turntable. The tail includes a tail housing, an advancing and retreating power system, and a fixed support system. The head and the tail are connected through a flexible component, and the tails are connected through flexible components.

20 Claims, 6 Drawing Sheets

(51) Int. Cl.
*E21F 17/18* (2006.01)
*G01V 1/40* (2006.01)

(56) References Cited

U.S. PATENT DOCUMENTS

| | | | | | |
|---|---|---|---|---|---|
| 3,355,215 | A | * | 11/1967 | Wallers | ................... E21D 9/111 |
| | | | | | 299/71 |
| 3,468,133 | A | * | 9/1969 | Matsushita | ................ E21D 9/06 |
| | | | | | 405/145 |
| 3,480,327 | A | * | 11/1969 | Matsushita | ................ E21D 9/10 |
| | | | | | 299/60 |
| 3,598,445 | A | * | 8/1971 | Winberg | ................ E21D 9/1093 |
| | | | | | 299/56 |
| 3,736,771 | A | * | 6/1973 | Safar | ....................... E21D 9/113 |
| | | | | | 464/163 |
| 4,311,344 | A | * | 1/1982 | Akesaka | ................ E21D 9/0879 |
| | | | | | 299/33 |
| 2023/0059714 | A1 | * | 2/2023 | Dong | ................ E21C 27/00 |

FOREIGN PATENT DOCUMENTS

| | | | |
|---|---|---|---|
| CN | 101824988 | A | 9/2010 |
| CN | 105781436 | B | 11/2017 |
| CN | 111451770 | A | 7/2020 |
| CN | 112065275 | A | 12/2020 |
| CN | 112904414 | A | 6/2021 |
| CN | 113107358 | A | 7/2021 |
| DE | 2023418 | * | 4/1971 |

* cited by examiner

ROCK-PIERCING FLEXIBLE ROCK DRILLING ROBOT AND ROCK BREAKING METHOD

CROSS REFERENCE TO THE RELATED APPLICATIONS

This application is based upon and claims priority to Chinese Patent Application No. 202110940989.4, filed on Aug. 17, 2021, the entire contents of which are incorporated herein by reference.

TECHNICAL FIELD

The present invention relates to the technical field of rock breaking in underground mines, and in particular, to a rock-piercing flexible rock drilling robot and a rock breaking method.

BACKGROUND

As mining goes deep, the ore rock becomes harder and more highly stressed, and the ore body becomes more dispersed, which makes it difficult to cut the hard rock and carry out continuous drilling and blasting operations, and may induce disasters such as rock bursts due to mining disturbance. Moreover, in conventional rock drilling, the drilling diameter is large, the equipment is difficult to transport, and the manual control of workers is labor-intensive, which restricts the safe and efficient recovery of rare metals.

Rock drilling is indispensable for deep resource mining. Experts and scholars have carried out many related researches on rock drilling. For example, Changsha Intelligent Manufacturing Research Institute and Central South University jointly have developed a 9-DOF tunnel segment intelligent drilling robot. It is based on the automatic drilling requirements of 34 different tunnel types and various installation hole positions of Jiangsu Metro Line 1, which integrates a series of terminal measurement and control apparatuses and can implement closed-loop servo control. Patent application No. CN2016103091707 entitled "Tunnel support drilling robot" is mainly used for automatically inserting an anchor rod after drilling for timely support. Patent application No. CN951206028 entitled "Shield tunnel boring machine" mainly uses a cutting bit on a tool spoke to enhance the cutting effect and is used for a tunnel of a curved shape. Patent application No. CN2021104528596 entitled "Anti-impact drilling robot and method for precise locating of drill rod" mainly performs drilling calibration for unmanned locating drilling and realizes prevention of ground pressure shock. Patent application No. CN2020110844261 entitled "Tunnel drilling robot system and control method, and tunnel boring machine" mainly achieves objectives of implementing intelligent continuous drilling operations, improving drilling consistency, and shortening the construction period. Patent application No. CN2020103193321, entitled "Intelligent drilling robot", is an intelligent and precise locating drilling robot developed mainly aimed at drilling required for processing carriages or large platforms. This equipment is easy to operate, significantly reduces the labor intensity, enhances the precision of drilling, and protects the environment of the production workshop. The patents and researches mentioned above mostly consider the aspects such as unmanned locating, intelligent support, and drilling of new shield structures. They are constrained by the requirement of bulky equipment, shallow underground and workshop environments, and all adopt pressure shearing as the rock breaking method. The use of bulky equipment leads to high energy consumption, inconvenient transportation, difficulty in maintenance, and the like, hindering the efficient exploitation of deep resources. The unmanned locating is mainly based on drilling calibration, which provides locating and navigation for bolt support. In addition, a person skilled in the art can know that the compressive strength of rock is far greater than its tensile and shear strength, and the deep high-stress rock mass is difficult to drill and leads to severe wear on the cutting tool. Therefore, the conventional rock breaking methods based on pressure shearing are not suitable for deep high-stress rock mass.

SUMMARY

The present invention provides a rock-piercing flexible rock drilling robot and a rock breaking method to resolve the problem that the existing rock drilling equipment cannot be applied to the deep high-stress rock mass.

According to a first aspect, a rock-piercing flexible rock drilling robot is provided, including a control system, a head, and at least one tail.

The head includes a head housing, a propulsion turntable located at an end of the head housing, and a drilling mechanism, a hydraulic propulsion system, a first driving mechanism, and a second driving mechanism that are arranged in the head housing. The propulsion turntable includes a drill bit located at a center thereof and a cutting turntable arranged around the drill bit. The first driving mechanism is connected to the drill bit, and the second driving mechanism is connected to the cutting turntable. The hydraulic propulsion system is configured to drive the first driving mechanism and the drill bit to reciprocate, and is further configured to drive the first driving mechanism, the second driving mechanism, and the propulsion turntable to reciprocate together.

The tail includes a tail housing, and an advancing and retreating power system and a fixed support system that are embedded in the tail housing. The head and the tail are connected through a flexible component, and the tails are connected through flexible components.

The hydraulic propulsion system, the first driving mechanism, the second driving mechanism, the drilling mechanism, the advancing and retreating power system, and the fixed support system are all electrically connected to the control system.

While operating the rock-piercing flexible rock drilling robot, the control system first controls the advancing and retreating power system to enter a construction location and then controls the fixed support system of the tail to operate. The fixed support system stretches out to make precise contact with the surrounding rock mass, so that the robot as a whole achieves a fixed effect. The control system then controls the drill bit to propel forward separately and groove, to form a free surface; and controls the drill bit and the cutting turntable to propel forward together. In this case, the cutting turntable is first controlled to cut the rock mass in a reciprocating and rotating manner within a preset angle range, to form a fan-shaped groove. Then the angle limit is canceled, so that the drill bit and the cutting turntable return to regular rotation and propulsion, and the uncut rock mass becomes sheared and stretched under a force, to achieve rock breaking by pulling and shearing. The control system may further control the drilling mechanism to drill the surrounding rock mass.

Further, the drilling mechanism includes at least one drilling assembly, and the drilling assembly includes a swing arm, a telescopic drill rod, and a drilling bit that are sequentially connected. The swing arm is configured to control a drilling direction, the drilling bit is configured for drilling, and the telescopic drill rod is configured to propel the drilling bit.

Further, the first driving mechanism includes a first motor and a connecting rod connected to an output shaft of the first motor, and an other end of the connecting rod is connected to the drill bit.

Further, the second driving mechanism includes a second motor, a transmission mechanism, and a turntable connector, the second motor drives, through the transmission mechanism, the turntable connector to rotate, and a front end of the turntable connector is connected to the cutting turntable.

Further, the hydraulic propulsion system includes a hydraulic power unit, and a first hydraulic bracket assembly and a second hydraulic bracket assembly that are connected to the hydraulic power unit, the second hydraulic bracket assembly is arranged around the first hydraulic bracket assembly, the first driving mechanism is mounted on the first hydraulic bracket assembly, and the second driving mechanism is mounted on the second hydraulic bracket assembly. When the first hydraulic bracket assembly operates, the first hydraulic bracket assembly may push the first driving mechanism to move, so that the independent reciprocation of the drill bit is implemented; and when the first hydraulic bracket assembly and the second hydraulic bracket assembly operate synchronously, the common reciprocation of the drill bit and the cutting turntable is implemented.

Further, the fixed support system includes four telescopic support rods and an arc-shaped support plate. The telescopic support rods are radially arranged and evenly distributed along a circumference of the tail housing. The arc-shaped support plate is fixedly connected to an outer end of each of the support rods and has a same radius as a radius of the circumference of the tail housing. When the robot needs to be fixed, the four support rods are controlled to extend outwards, drive the arc-shaped support plate to move and expand outward, and tightly abut against the surrounding rock mass to implement the overall fixation of the robot. When the robot needs to move forward and backward, it is necessary to control the four support rods to retract and reset, and then control the advancing and retreating power system to drive the robot forward and backward.

Further, a water inlet pipe is arranged at an upper portion in the head housing, and a slag discharge pipe is further arranged at a bottom portion in the head housing. The water inlet pipe is configured for continuous water supply during construction, to achieve the functions of cooling, dustproof, and reducing equipment wear. The rock drilled off during forward propulsion flows, under the joint action of the water and the rotation of the propulsion turntable, into the slag discharge pipe for slag discharge treatment.

Further, the flexible component includes a flexible housing and a spring-like connector arranged in the flexible housing. The flexible components are used as connectors to ensure that the robot can change an excavation direction at a slight angle to avoid unfavorable terrain.

Further, a navigation system electrically connected to the control system is included, where the navigation system includes a locating module and a disaster identification and locating module.

The locating module is configured to obtain a location of the rock-piercing flexible rock drilling robot and transmit the location to the control system.

The disaster identification and locating module includes a multi-band sensing unit and a variable-frequency seismic source. The variable-frequency seismic sources and seismic sources during collaborative excavation are used as signal sources. The multi-band sensing unit is configured to identify and determine a disaster location according to a received signal and transmit the disaster location to the control system.

The control system is configured to navigate the rock-piercing flexible rock drilling robot according to the received location of the rock-piercing flexible rock drilling robot and the received disaster location.

The locating module is configured to locate the robot and provide location information of the robot for navigation. The disaster identification and locating module uses the variable-frequency seismic sources and the seismic sources during collaborative excavation as the signal sources. A signal is received by the multi-band sensing unit after propagating in the surrounding rock mass. Whether there is a disaster (for example, deformation of the surrounding rock mass, rupture, large fault, or groundwater) is identified according to the received signal. If there is a disaster, a location of the disaster is identified and provided to the control system. The control system then controls the robot to change the direction to avoid the disaster location. In addition, during drilling, the identification and locating of disasters are also carried out and sent to the control system, and the control system then controls the drilling direction.

According to a second aspect, a rock breaking method using the foregoing rock-piercing flexible rock drilling robot is provided and includes:

controlling, by the control system, the hydraulic propulsion system to propel the first driving mechanism and the drill bit forward, and controlling the first driving mechanism to operate, so that the drill bit pre-grooves to form a free surface;

controlling, by the control system, the hydraulic propulsion system to reset the first driving mechanism and the drill bit, and controlling the hydraulic propulsion system to simultaneously provide a thrust to the first driving mechanism, the second driving mechanism, and the propulsion turntable;

controlling, by the control system, the second driving mechanism to cut a rock mass in a reciprocating and rotating manner within a preset angle range, to form a fan-shaped groove; and canceling, by the control system, the angle control, and controlling the first driving mechanism and the second driving mechanism to operate regularly, so that the propulsion turntable is aligned with the fan-shaped groove and rotates and propels regularly, and the uncut rock mass becomes sheared and stretched under a force, to achieve rock breaking by pulling and shearing.

Advantages

The present invention provides a rock-piercing flexible rock drilling robot and a rock breaking method therefor. The propulsion turntable is split into the independently operating drill bit and cutting turntable, so that the conventional rock breaking by pressure shearing can be changed into rock breaking by pulling and shearing, thereby effectively improving the rock breaking efficiency and reducing the wear of the cutting turntable. The present invention is applicable to the deep high-stress rock mass. The advancing and retreating power system is adopted, which can achieve functions of moving forward and backward, and climbing.

In case of equipment failure, it is also easy to exit for inspection. The robot can perform horizontal rock drilling and propulsion and drill blast holes and pressure relief holes in the horizontal and vertical directions.

BRIEF DESCRIPTION OF THE DRAWINGS

For a clearer description of the technical solutions in the embodiments of the present invention or in the existing technologies, the following briefly describes the accompanying drawings required for describing the embodiments or the existing technologies. The accompanying drawings in the following description show only some embodiments of the present invention, and a person of ordinary skill in the art may still derive other drawings from these accompanying drawings without creative efforts.

Figure 1:
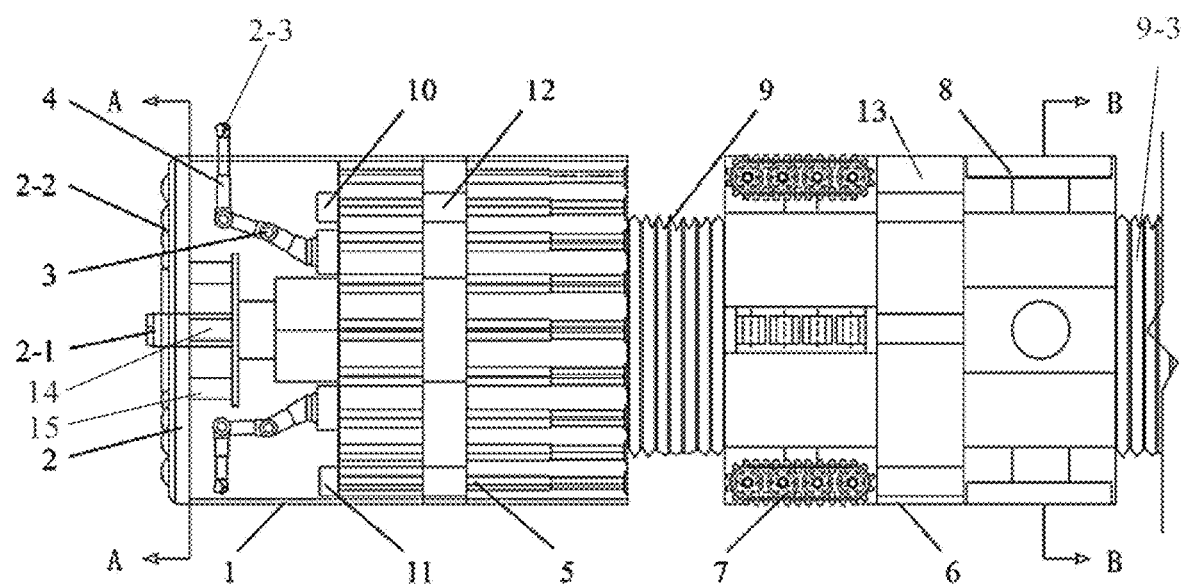
FIG. 1 is a schematic structural diagram of a rock-piercing flexible rock drilling robot according to an embodiment of the present invention.
Figure 2:
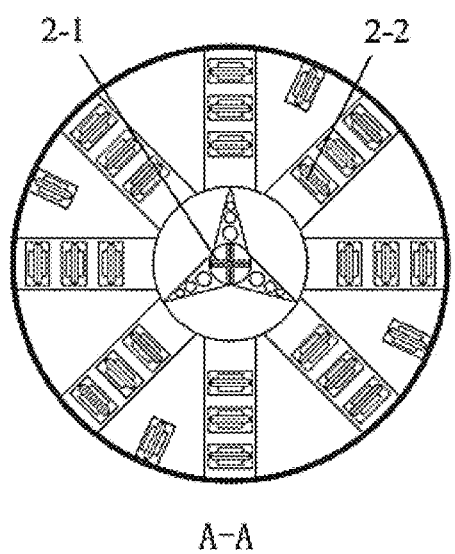
FIG. 2 is a cross-sectional view of a propulsion turntable according to an embodiment of the present invention.
Figure 3:
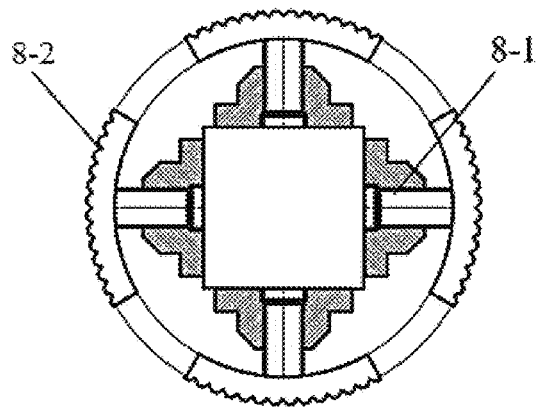
FIG. 3 is a cross-sectional view of a fixed support system according to an embodiment of the present invention.

In the figures: 1: head; 2: propulsion turntable; 2-1: drill bit; 2-2: cutting turntable; 2-3: drilling bit; 3: swing arm; 4: telescopic drill rod; 5: hydraulic propulsion system; 6: tail; 7: advancing and retreating power system; 8: fixed support system; 8-1: support rod; 8-2: arc-shaped support plate; 9: flexible component; 9-1: flexible housing; 9-2: spring-like connector; 9-3: second flexible component; 10: water inlet pipe; 11: slag discharge pipe; 12: head housing; 13: tail housing; 14: connecting rod; 15: turntable connector; 16: first hydraulic bracket assembly; 17: second hydraulic bracket assembly.

DETAILED DESCRIPTION OF THE EMBODIMENTS

To make the objectives, technical solutions, and advantages of the present invention clearer, the technical solutions of the present invention are described in detail below. Apparently, the described embodiments are merely some embodiments rather than all the embodiments of the present invention. All other implementations obtained by a person of ordinary skill in the art based on the embodiments of the present invention without creative efforts shall fall within the protection scope of the present invention.

In the description of the present invention, it should be understood that orientation or position relationships indicated by the terms such as "upper", "lower", "front", "rear", "left", "right", "top", "bottom", "inner", "outer", "center", "longitudinal", "transverse", "vertical", and "horizontal" are based on orientation or position relationships shown in the accompanying drawings, and are used only for ease and brevity of illustration and description of the present invention, rather than indicating or implying that the mentioned apparatus or component needs to have a particular orientation or needs to be constructed and operated in a particular orientation. Therefore, such terms should not be construed as limiting of the present invention.

It should be noted that, in the description of the present invention, the terms "first", "second" and the like are used for the purpose of description only and are not to be construed as indicating or implying relative importance or sequence. In addition, in the description of the present invention, unless otherwise stated, "a plurality of" means at least two.

As shown in FIG. 1 to FIGS. 8A-8C, an embodiment provides a rock-piercing flexible rock drilling robot, including a control system, a head 1, and at least one tail 6.

The head 1 includes a head housing 12, a propulsion turntable 2 located at an end of the head housing 12, and a drilling mechanism, a hydraulic propulsion system 5, a first driving mechanism, and a second driving mechanism that are arranged in the head housing 12. The propulsion turntable 2 includes a drill bit 2-1 located at a center thereof and a cutting turntable 2-2 arranged around the drill bit 2-1. The first driving mechanism is connected to the drill bit 2-1, and the second driving mechanism is connected to the cutting turntable 2-2. The hydraulic propulsion system 5 is configured to drive the first driving mechanism and the drill bit 2-1 to reciprocate, and is further configured to drive the first driving mechanism, the second driving mechanism, and the propulsion turntable 2 to reciprocate together.

The tail 6 includes a tail housing 13, and an advancing and retreating power system 7 and a fixed support system 8 that are embedded in the tail housing 13. The head 1 and the tail 6 are connected through a flexible component 9, and the tails 6 are connected through flexible components 9.

The hydraulic propulsion system 5, the first driving mechanism, the second driving mechanism, the drilling mechanism, the advancing and retreating power system 7, and the fixed support system 8 are all electrically connected to the control system.

Specifically, as shown in FIG. 1 and FIGS. 8A-8C, the drilling mechanism includes at least one drilling assembly. The drilling assembly includes a swing arm 3, a telescopic drill rod 4, and a drilling bit 2-3 that are sequentially connected. In this embodiment, the drilling mechanism includes four drilling assemblies, and the four drilling assemblies are evenly distributed in four orientations of up, down, left, and right in the head 1. The swing arm 3 is configured to control a drilling direction, the drilling bit 2-3 is configured for drilling, and the telescopic drill rod 4 is configured to propel the drilling bit 2-3.

The fixed support system 8 includes four telescopic support rods 8-1 and an arc-shaped support plate 8-2. The telescopic support rods 8-1 are radially arranged and evenly distributed along a circumference of the tail housing 13. The arc-shaped support plate 8-2 is fixedly connected to an outer end of each of the support rods 8-1 and has a same radius as a radius of the circumference of the tail housing 13. When the robot needs to be fixed, the four support rods 8-1 are controlled to extend outwards, drive the arc-shaped support plate 8-2 to move and expand outward, and tightly abut against the surrounding rock mass to implement the overall fixation of the robot. When the robot needs to move forward and backward, it is necessary to control the four support rods 8-1 to retract and reset, and then control the advancing and retreating power system 7 to drive the robot forward and backward.

The first driving mechanism includes a first motor and a connecting rod 14 connected to an output shaft of the first motor, and an other end of the connecting rod 14 is connected to the drill bit 2-1. The second driving mechanism includes a second motor, a transmission mechanism, and a turntable connector 15, the second motor drives, through the transmission mechanism, the turntable connector 15 to rotate, and a front end of the turntable connector 15 is connected to the cutting turntable 2-2. The hydraulic propulsion system 5 includes a hydraulic power unit, and a first hydraulic bracket assembly 16 and a second hydraulic bracket assembly 17 that are connected to the hydraulic power unit, the second hydraulic bracket assembly 17 is arranged around the first hydraulic bracket assembly 16, the first driving mechanism is mounted on the first hydraulic bracket assembly 16, and the second driving mechanism is mounted on the second hydraulic bracket assembly 17. When the first hydraulic bracket assembly 16 operates, the first hydraulic bracket assembly 16 may push the first driving mechanism to move, so that the independent reciprocation of the drill bit 2-1 is implemented. When the first hydraulic bracket assembly 16 and the second hydraulic bracket assembly 17 operate synchronously, the common reciprocation of the drill bit 2-1 and the cutting turntable 2-2 is implemented.

In a specific implementation, the turntable connector 15 of the second driving mechanism is sleeved outside the connecting rod 14 of the first driving mechanism, to form a structure similar to a sleeve, thereby implementing the forward and backward movement of the connecting rod 14 in an axial direction. The first motor is mounted on the first hydraulic bracket assembly 16. An end of the turntable connector 15 may be mounted on the second hydraulic bracket assembly 17 through a bearing seat. The second motor is also mounted on the second hydraulic bracket assembly 17. The transmission mechanism may select a transmission manner such as gear transmission or belt transmission. The first hydraulic bracket assembly 16 may be optionally formed by at least one hydraulic cylinder and a mounting plate connected to an output end of a piston rod of the hydraulic cylinder. The second hydraulic bracket assembly 17 may be optionally formed by of a plurality of hydraulic cylinders arranged in an annular shape and an annular mounting plate connected to output ends of piston rods of the plurality of hydraulic cylinders. The hydraulic power unit of the hydraulic propulsion system 5 may be optionally arranged in the head 1 or outside the robot. Hydraulic oil is delivered to the hydraulic cylinders of the first hydraulic bracket assembly 16 and the second hydraulic bracket assembly 17 through pipelines. The four telescopic support rods 8-1 of the fixed support system 8 and the telescopic drill rod 4 may also be implemented by hydraulic cylinders powered by the hydraulic power unit. Indeed, in other embodiments, the hydraulic propulsion system 5, the support rods 8-1, and the telescopic drill rod 4 may be alternatively implemented by a pneumatic power system.

In this embodiment, a water inlet pipe 10 is arranged at an upper portion in the head housing 12, and a slag discharge pipe 11 is further arranged at a bottom portion in the head housing 12. The water inlet pipe 10 is configured for continuous water supply during construction, to achieve the functions of cooling, dustproof, and reducing equipment wear. The rock drilled off during forward propulsion flows, under the joint action of the water and the rotation of the propulsion turntable 2, into the slag discharge pipe 11 for slag discharge treatment.

Preferably, a navigation system electrically connected to the control system is included, where the navigation system includes a locating module and a disaster identification and locating module. The locating module is configured to obtain a location of the rock-piercing flexible rock drilling robot and transmit the location to the control system. The disaster identification and locating module includes a multi-band sensing unit and a variable-frequency seismic source. The variable-frequency seismic sources and the seismic sources during collaborative excavation are used as signal sources. The multi-band sensing unit is configured to identify and determine a disaster location according to a received signal and transmit the disaster location to the control system. The control system is configured to navigate the rock-piercing flexible rock drilling robot according to the received location of the rock-piercing flexible rock drilling robot and the received disaster location.

The locating module is configured to locate the robot and provide location information of the robot for navigation. The locating module is in the prior art and is not described herein again. The disaster identification and locating module uses the variable-frequency seismic sources and the seismic sources during collaborative excavation as the signal sources. A signal is received by the multi-band sensing unit after propagating in the surrounding rock mass. Whether there is a disaster (for example, deformation of the surrounding rock mass, rupture, large fault, or groundwater) is identified according to the received signal. If there is a disaster, a location of the disaster is identified and provided to the control system. The control system then controls the robot to change the direction to avoid the disaster location. In addition, during drilling, the identification and locating of disasters are also carried out and sent to the control system, and the control system then controls the drilling direction. For the specific implementation solution of the multi-band sensing unit, reference may be made to the Chinese patent No. CN2021100687984 and entitled "method for positioning geoacoustic event, method for early warning destabilization disasters thereof, geoacoustic sensor, and monitoring system and readable storage medium thereof". The multi-band geoacoustic intelligent sensor and the method for positioning a geoacoustic event provided in the patent can both locate disasters such as deformation of the surrounding rock mass, rupture, large fault, or groundwater. The specific implementation process is not described herein again.

Figure 7A:
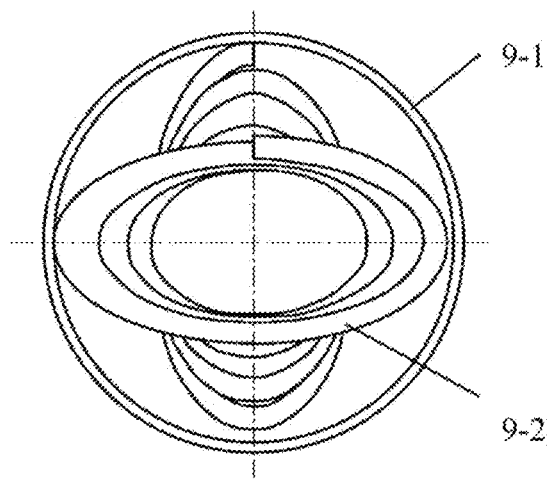
FIGS. 7A-7B are structural diagrams of a flexible component according to an embodiment of the present invention.
Figure 7B:
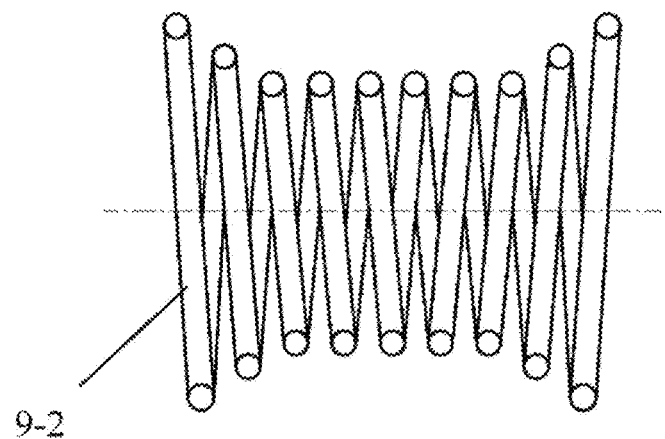
Figure 8A:
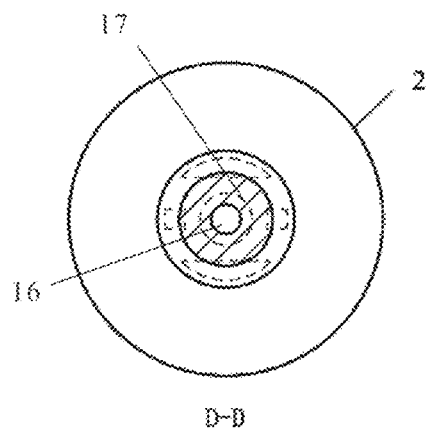
FIGS. 8A-8C are schematic diagrams of an internal structure of a propulsion turntable according to an embodiment of the present invention.
Figure 8B:
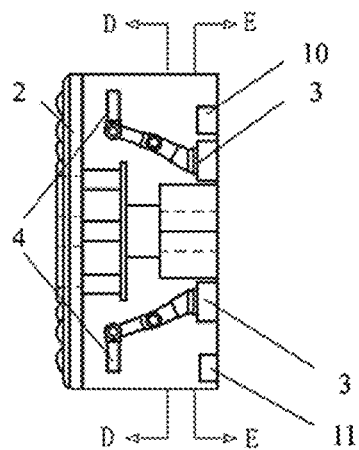
Figure 8C:
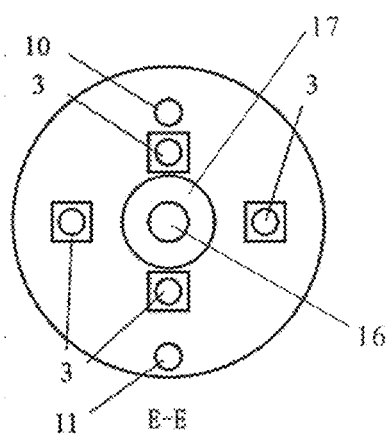

As shown in FIGS. 7A-7B, in this embodiment, the flexible component 9 includes a flexible housing 9-1 and a spring-like connector 9-2 arranged in the flexible housing 9-1. The flexible components 9 are used as connectors to ensure that the robot can change an excavation direction at a slight angle, to avoid unfavorable or disaster terrain, and achieve safe rock drilling.

In a specific implementation, the cutting turntable 2-2 includes a plurality of cutting tools. In this embodiment, there are 28 cutting tools, and both the head 1 and the tail 6 are cylinders with a diameter of 1 m. Indeed, in some other embodiments, according to requirements of actual operating conditions, the quantity of cutting tools and the diameters of the head 1 and the tail 6 may be adjusted.

Based on the rock-piercing flexible rock drilling robot provided in the foregoing embodiments, a method for excavating, rock breaking, and drilling by using the rock-piercing flexible rock drilling robot is further provided.

Referring to FIG. 1, FIG. 3, FIG. 4, and FIGS. 6A-6B, the rock-piercing flexible rock drilling robot propels forward, and the main steps are as follows:

a: The control system controls the support rods 8-1 in the fixed support system 8 to extend outward, so that the arc-shaped support plate 8-2 is in close contact with the surrounding rock mass, thereby achieving an overall fixing effect.

b: The control system controls the drill bit 2-1 to pre-groove the operating face to form a free surface. As shown in C-C in FIGS. 7A-7B, after the grooving is completed, the control system controls the drill bit 2-1 to retreat and return to the original location (that is, coupled with the propulsion turntable 2).

c: The control system controls the hydraulic propulsion system 5 to apply a horizontal thrust to the propulsion turntable 2. Through the interaction between the rotation and the horizontal thrust, the cutting turntable 2-2 and the rock mass act to cause pulling and shearing damage, so that the head 1 propels forward.

d: A forward telescopic amount of the head 1 of the rock-piercing flexible rock drilling robot is controlled by a telescopic amount of the hydraulic propulsion system 5. When the telescopic amount of the head 1 is limited, the support rods 8-1 are controlled to contract inward.

e: The control system controls the advancing and retreating power system 7 to cause the robot to move forward as a whole until the propulsion turntable 2 fits the operating surface, stops the movement of the advancing and retreating power system 7, and then controls the support rods 8-1 to extend out the next time. That is, an excavation cycle is then completed.

f: The water inlet pipe 10 continuously supplies water during construction, to achieve the functions of cooling, dustproof, and reducing equipment wear. The rock drilled off during forward propulsion flows, under the joint action of the water and the rotation of the propulsion turntable 2, into the slag discharge pipe 11 for slag discharge treatment.

Figure 4:
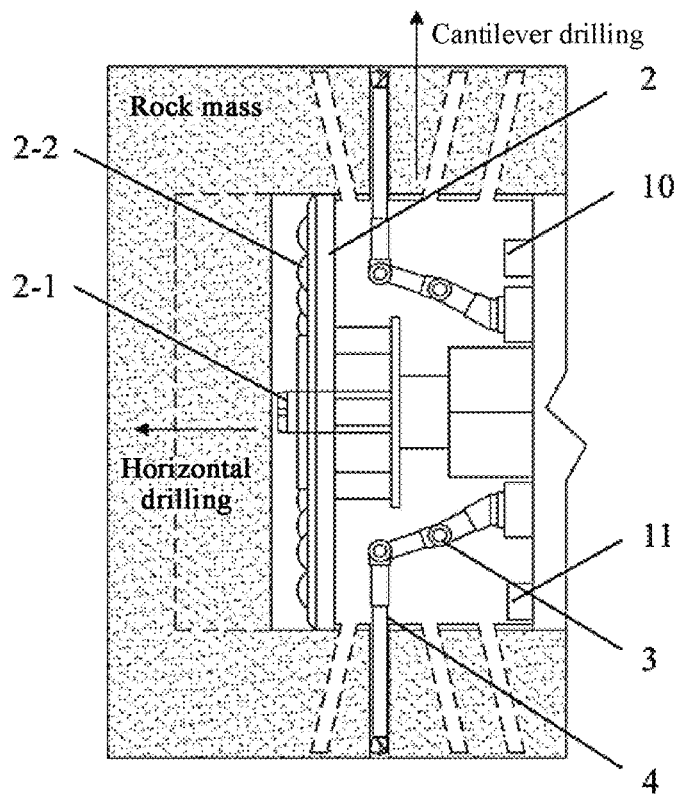
FIG. 4 is a construction diagram of a head of a rock-piercing flexible rock drilling robot according to an embodiment of the present invention.
Figure 5:
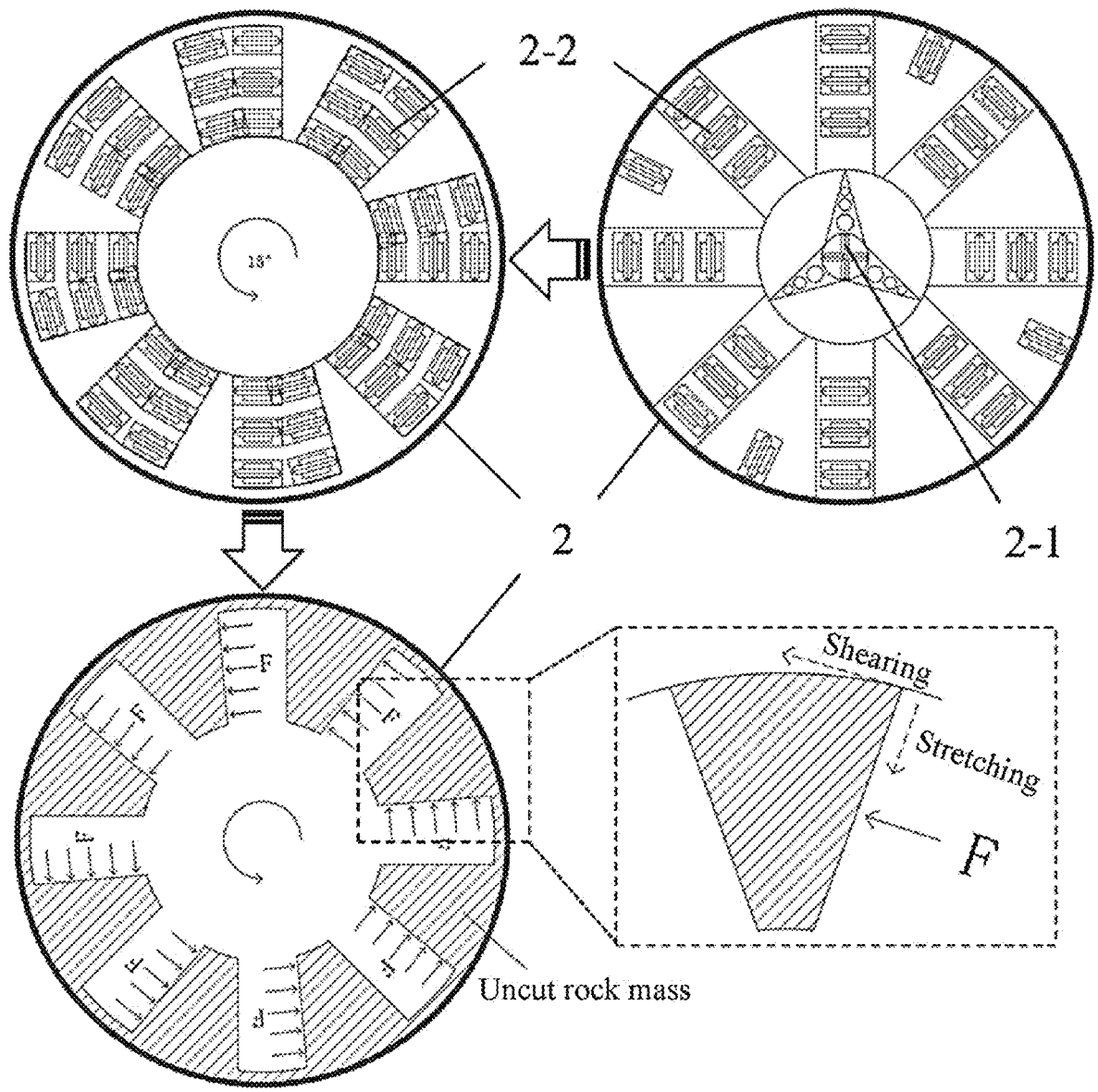
FIG. 5 is a principle diagram of rock breaking according to an embodiment of the present invention.
Figure 6A:
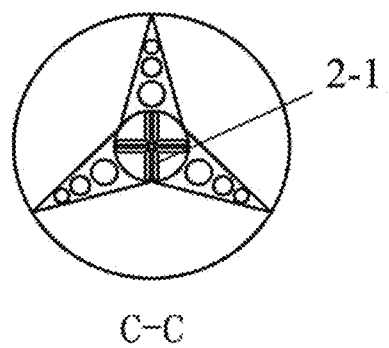
FIGS. 6A-6B are schematic diagrams of a drill bit according to an embodiment of the present invention.
Figure 6B:
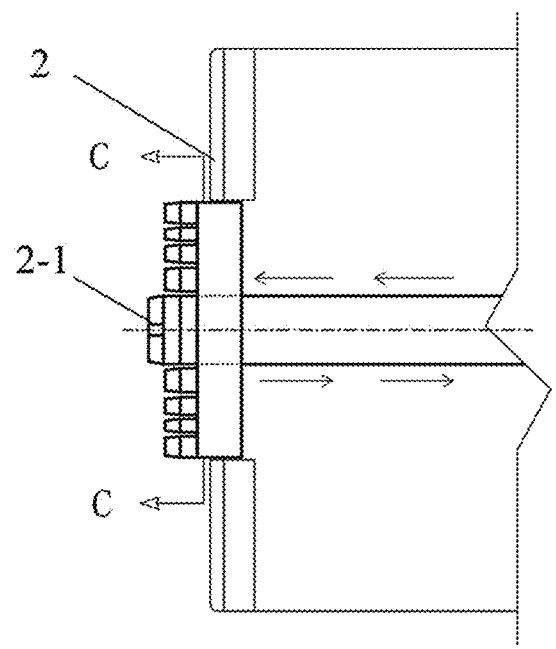

Referring to FIG. 4 and FIG. 5, the rock breaking steps of drilling by the rock-piercing flexible rock drilling robot are as follows:

a: controlling, by the control system, the hydraulic propulsion system 5 to propel the first driving mechanism and the drill bit 2-1 forward, and controlling the first driving mechanism to operate, so that the drill bit 2-1 pre-grooves to form a free surface;

b: controlling, by the control system, the hydraulic propulsion system 5 to reset the first driving mechanism and the drill bit 2-1, and controlling the hydraulic propulsion system 5 to simultaneously provide a thrust to the first driving mechanism, the second driving mechanism, and the propulsion turntable 2;

c: controlling, by the control system, the second driving mechanism to cut a rock mass in a reciprocating and rotating manner within a preset angle range, to form a fan-shaped groove; and d: canceling, by the control system, the angle control, and controlling the first driving mechanism and the second driving mechanism to operate regularly, so that the propulsion turntable 2 is aligned with the fan-shaped groove and rotates and propels regularly, and the uncut rock mass becomes sheared and stretched under a force, to achieve rock breaking by pulling and shearing.

Referring to FIG. 1 and FIG. 4, the steps of drilling blast holes and pressure relief holes by the rock-piercing flexible rock drilling robot are as follows:

a: controlling the support rods 8-1 in the fixed support system 8 to extend outward, to complete the overall fixation;

b: determine a location of a hole to be drilled according to locating of the multi-band sensing unit;

c: using the control system to control the swing arm 3, the telescopic drill rod 4, and the drilling bit 2-3, to drill the predetermined hole; and d: continuously supplying water by the water inlet pipe 10 during construction, to achieve the functions of cooling, dustproof, and reducing equipment wear. The slag washed from the hole flows into the slag discharge pipe 11 through the rotation action for slag discharge treatment.

It may be understood that, for the same or similar parts in the foregoing embodiments, reference may be made to each other, and for content not described in detail in some embodiments, reference may be made to the same or similar content in some other embodiments.

The rock-piercing flexible rock drilling robot provided in the foregoing embodiments has the following advantages:

a: The robot has a small size, and the equipment has low energy consumption.

b: The robot can change the excavation direction at a slight angle to avoid unfavorable terrain.

c: The robot can achieve the functions of moving forward and backward, and climbing. In case of equipment failure, the robot can exit for inspection.

d: The conventional rock breaking by pressure shearing is changed into rock breaking by pulling and shearing, thereby improving the rock breaking efficiency and reducing the wear of the cutting tool.

e: The robot can perform horizontal rock drilling and propulsion and drill blast holes and pressure relief holes in the horizontal and vertical directions.

Although the embodiments of the present invention are shown and described above, it may be understood that, the foregoing embodiments are exemplary, and cannot be construed as a limitation to the present invention. Within the scope of the present invention, a person of ordinary skill in the art may make changes, modifications, replacement, and variations to the foregoing embodiments.

What is claimed is:

1. A rock-piercing flexible rock drilling robot, comprising: a control system, a head, and at least one tail, wherein
the head comprises a head housing, a propulsion turntable, wherein the propulsion turntable is located at an end of the head housing, and the head comprises a drilling mechanism, a hydraulic propulsion system, a first driving mechanism, and a second driving mechanism, wherein the drilling mechanism, the hydraulic propulsion system, the first driving mechanism, and the second driving mechanism are arranged in the head housing;
the propulsion turntable comprises a drill bit and a cutting turntable, wherein the drill bit is located at a center of the propulsion turntable and the cutting turntable is arranged around the drill bit;
the first driving mechanism is connected to the drill bit, and the second driving mechanism is connected to the cutting turntable; and the hydraulic propulsion system is configured to drive the first driving mechanism and the drill bit to reciprocate, and the hydraulic propulsion system is further configured to drive the first driving mechanism, the second driving mechanism, and the propulsion turntable to reciprocate together;
the at least one tail comprises a tail housing, and the at least one tail comprises an advancing and retreating power system and a fixed support system, wherein the advancing and retreating power system and the fixed support system are embedded in the tail housing; and
the head and the at least one tail are connected through a first flexible component, and the at least one tail and subsequent tails are connected through second flexible components; and the hydraulic propulsion system, the first driving mechanism, the second driving mechanism, the drilling mechanism, the advancing and retreating power system, and the fixed support system are electrically connected to the control system.

2. The rock-piercing flexible rock drilling robot according to claim 1, wherein the drilling mechanism comprises at least one drilling assembly, and the at least one drilling assembly comprises a swing arm, a telescopic drill rod, and a drilling bit, wherein the swing arm, the telescopic drill rod, and the drilling bit are sequentially connected.

3. The rock-piercing flexible rock drilling robot according to claim 2, further comprising a navigation system, the navigation system is electrically connected to the control system, wherein the navigation system comprises a locating module and a disaster identification and locating module;

the locating module is configured to obtain a location of the rock-piercing flexible rock drilling robot and the locating module is configured to transmit the location of the rock-piercing flexible rock drilling robot to the control system;

the disaster identification and locating module comprises a multi-band sensing unit and a variable-frequency seismic source, the variable-frequency seismic sources and seismic sources during a collaborative excavation are configured as signal sources, and the multi-band sensing unit is configured to identify and determine a disaster location according to a received signal and the multi-band sensing unit is configured to transmit the disaster location to the control system; and the control system is configured to navigate the rock-piercing flexible rock drilling robot according to the location of the rock-piercing flexible rock drilling robot and the disaster location.

4. The rock-piercing flexible rock drilling robot according to claim 1, wherein the first driving mechanism comprises a first motor and a connecting rod, wherein a first end of the connecting rod is connected to an output shaft of the first motor, and a second end of the connecting rod is connected to the drill bit.

5. The rock-piercing flexible rock drilling robot according to claim 4, wherein the second driving mechanism comprises a second motor, a transmission mechanism, and a turntable connector, the second motor drives, through the transmission mechanism, the turntable connector to rotate, and a front end of the turntable connector is connected to the cutting turntable.

6. The rock-piercing flexible rock drilling robot according to claim 5, further comprising a navigation system, the navigation system is electrically connected to the control system, wherein the navigation system comprises a locating module and a disaster identification and locating module;

the locating module is configured to obtain a location of the rock-piercing flexible rock drilling robot and the locating module is configured to transmit the location of the rock-piercing flexible rock drilling robot to the control system;

the disaster identification and locating module comprises a multi-band sensing unit and a variable-frequency seismic source, the variable-frequency seismic sources and seismic sources during a collaborative excavation are configured as signal sources, and the multi-band sensing unit is configured to identify and determine a disaster location according to a received signal and the multi-band sensing unit is configured to transmit the disaster location to the control system; and the control system is configured to navigate the rock-piercing flexible rock drilling robot according to the location of the rock-piercing flexible rock drilling robot and the disaster location.

7. The rock-piercing flexible rock drilling robot according to claim 4, further comprising a navigation system, the navigation system is electrically connected to the control system, wherein the navigation system comprises a locating module and a disaster identification and locating module;

the locating module is configured to obtain a location of the rock-piercing flexible rock drilling robot and the locating module is configured to transmit the location of the rock-piercing flexible rock drilling robot to the control system;

the disaster identification and locating module comprises a multi-band sensing unit and a variable-frequency seismic source, the variable-frequency seismic sources and seismic sources during a collaborative excavation are configured as signal sources, and the multi-band sensing unit is configured to identify and determine a disaster location according to a received signal and the multi-band sensing unit is configured to transmit the disaster location to the control system; and the control system is configured to navigate the rock-piercing flexible rock drilling robot according to the location of the rock-piercing flexible rock drilling robot and the disaster location.

8. The rock-piercing flexible rock drilling robot according to claim 1, wherein the hydraulic propulsion system comprises a hydraulic power unit, and a first hydraulic bracket assembly and a second hydraulic bracket assembly, wherein the first hydraulic bracket assembly and the second hydraulic bracket assembly are connected to the hydraulic power unit, the second hydraulic bracket assembly is arranged around the first hydraulic bracket assembly, the first driving mechanism is mounted on the first hydraulic bracket assembly, and the second driving mechanism is mounted on the second hydraulic bracket assembly.

9. The rock-piercing flexible rock drilling robot according to claim 8, further comprising a navigation system, the navigation system is electrically connected to the control system, wherein the navigation system comprises a locating module and a disaster identification and locating module;

the locating module is configured to obtain a location of the rock-piercing flexible rock drilling robot and the locating module is configured to transmit the location of the rock-piercing flexible rock drilling robot to the control system;

the disaster identification and locating module comprises a multi-band sensing unit and a variable-frequency seismic source, the variable-frequency seismic sources and seismic sources during a collaborative excavation are configured as signal sources, and the multi-band sensing unit is configured to identify and determine a disaster location according to a received signal and the multi-band sensing unit is configured to transmit the disaster location to the control system; and the control system is configured to navigate the rock-piercing flexible rock drilling robot according to the location of the rock-piercing flexible rock drilling robot and the disaster location.

10. The rock-piercing flexible rock drilling robot according to claim 1, wherein the fixed support system comprises four telescopic support rods and an arc-shaped support plate, the four telescopic support rods are radially arranged and evenly distributed along a circumference of the tail housing, and the arc-shaped support plate is fixedly connected to an outer end of each of the four telescopic support rods and the arc-shaped support plate has a same radius as a radius of the circumference of the tail housing.

11. The rock-piercing flexible rock drilling robot according to claim 10, further comprising a navigation system, the navigation system is electrically connected to the control system, wherein the navigation system comprises a locating module and a disaster identification and locating module;
the locating module is configured to obtain a location of the rock-piercing flexible rock drilling robot and the locating module is configured to transmit the location of the rock-piercing flexible rock drilling robot to the control system;
the disaster identification and locating module comprises a multi-band sensing unit and a variable-frequency seismic source, the variable-frequency seismic sources and seismic sources during a collaborative excavation are configured as signal sources, and the multi-band sensing unit is configured to identify and determine a disaster location according to a received signal and the multi-band sensing unit is configured to transmit the disaster location to the control system; and
the control system is configured to navigate the rock-piercing flexible rock drilling robot according to the location of the rock-piercing flexible rock drilling robot and the disaster location.

12. The rock-piercing flexible rock drilling robot according to claim 1, wherein a water inlet pipe is arranged at an upper portion in the head housing, and a slag discharge pipe is further arranged at a bottom portion in the head housing.

13. The rock-piercing flexible rock drilling robot according to claim 12, further comprising a navigation system, the navigation system is electrically connected to the control system, wherein the navigation system comprises a locating module and a disaster identification and locating module;
the locating module is configured to obtain a location of the rock-piercing flexible rock drilling robot and the locating module is configured to transmit the location of the rock-piercing flexible rock drilling robot to the control system;
the disaster identification and locating module comprises a multi-band sensing unit and a variable-frequency seismic source, the variable-frequency seismic sources and seismic sources during a collaborative excavation are configured as signal sources, and the multi-band sensing unit is configured to identify and determine a disaster location according to a received signal and the multi-band sensing unit is configured to transmit the disaster location to the control system; and
the control system is configured to navigate the rock-piercing flexible rock drilling robot according to the location of the rock-piercing flexible rock drilling robot and the disaster location.

14. The rock-piercing flexible rock drilling robot according to claim 1, wherein the first and second flexible components comprise a flexible housing and a spring-like connector, wherein the spring-like connector is arranged in the flexible housing.

15. The rock-piercing flexible rock drilling robot according to claim 14, further comprising a navigation system, the navigation system is electrically connected to the control system, wherein the navigation system comprises a locating module and a disaster identification and locating module;
the locating module is configured to obtain a location of the rock-piercing flexible rock drilling robot and the locating module is configured to transmit the location of the rock-piercing flexible rock drilling robot to the control system;
the disaster identification and locating module comprises a multi-band sensing unit and a variable-frequency seismic source, the variable-frequency seismic sources and seismic sources during a collaborative excavation are configured as signal sources, and the multi-band sensing unit is configured to identify and determine a disaster location according to a received signal and the multi-band sensing unit is configured to transmit the disaster location to the control system; and
the control system is configured to navigate the rock-piercing flexible rock drilling robot according to the location of the rock-piercing flexible rock drilling robot and the disaster location.

16. The rock-piercing flexible rock drilling robot according to claim 1, further comprising a navigation system, the navigation system is electrically connected to the control system, wherein the navigation system comprises a locating module and a disaster identification and locating module;
the locating module is configured to obtain a location of the rock-piercing flexible rock drilling robot and the locating module is configured to transmit the location of the rock-piercing flexible rock drilling robot to the control system;
the disaster identification and locating module comprises a multi-band sensing unit and a variable-frequency seismic source, the variable-frequency seismic sources and seismic sources during a collaborative excavation are configured as signal sources, and the multi-band sensing unit is configured to identify and determine a disaster location according to a received signal and the multi-band sensing unit is configured to transmit the disaster location to the control system; and
the control system is configured to navigate the rock-piercing flexible rock drilling robot according to the location of the rock-piercing flexible rock drilling robot and the disaster location.

17. A rock breaking method of the rock-piercing flexible rock drilling robot according to claim 1, comprising:
controlling, by the control system, the hydraulic propulsion system to propel the first driving mechanism and the drill bit forward, and controlling the first driving mechanism to operate, wherein the drill bit pre-grooves to form a free surface;
controlling, by the control system, the hydraulic propulsion system to reset the first driving mechanism and the drill bit, and controlling the hydraulic propulsion system to simultaneously provide a thrust to the first driving mechanism, the second driving mechanism, and the propulsion turntable;
controlling, by the control system, the second driving mechanism to cut a rock mass in a reciprocating and rotating manner within a preset angle range, to form a fan-shaped groove; and
canceling, by the control system, an angle control, and controlling the first driving mechanism and the second driving mechanism to operate, wherein the propulsion turntable is aligned with the fan-shaped groove and the propulsion turntable rotates and propels, and an uncut rock mass becomes sheared and stretched under a force, to achieve a rock breaking by a pulling and a shearing.

18. The rock breaking method according to claim 17, wherein in the rock-piercing flexible rock drilling robot, the drilling mechanism comprises at least one drilling assembly, and the at least one drilling assembly comprises a swing arm, a telescopic drill rod, and a drilling bit, wherein the swing arm, the telescopic drill rod, and the drilling bit are sequentially connected.

19. The rock breaking method according to claim 17, wherein in the rock-piercing flexible rock drilling robot, the first driving mechanism comprises a first motor and a connecting rod, wherein a first end of the connecting rod is connected to an output shaft of the first motor, and a second end of the connecting rod is connected to the drill bit.

20. The rock breaking method according to claim 19, wherein in the rock-piercing flexible rock drilling robot, the second driving mechanism comprises a second motor, a transmission mechanism, and a turntable connector, the second motor drives, through the transmission mechanism, the turntable connector to rotate, and a front end of the turntable connector is connected to the cutting turntable.

* * * * *

UNITED STATES PATENT AND TRADEMARK OFFICE
CERTIFICATE OF CORRECTION

PATENT NO. : 12,385,391 B2  
APPLICATION NO. : 17/889345  
DATED : August 12, 2025  
INVENTOR(S) : Longjun Dong et al.

Page 1 of 1

It is certified that error appears in the above-identified patent and that said Letters Patent is hereby corrected as shown below:

On the Title Page

Insert item (30):
--(30) Foreign Application Priority Data
Aug. 17, 2021 (CN) .................... 202110940989.4--

Signed and Sealed this
Twenty-third Day of December, 2025

John A. Squires
*Director of the United States Patent and Trademark Office*